US005837744A

United States Patent [19]

Nagashima et al.

[11] Patent Number: 5,837,744

[45] Date of Patent: Nov. 17, 1998

[54] POLYOXYMETHYLENE ARTICLES HAVING PRINTABLE SURFACE METHOD OF IMPARTING PRINTABILITY TO POLYOXYMETHYLENE

[75] Inventors: Naoyuki Nagashima; Hitoshi Azegami, both of Nagano-Ken; Yasufumi Takasugi, Saku, all of Japan

[73] Assignee: TDK Corporation, Tokyo, Japan

[21] Appl. No.: 674,083

[22] Filed: Jul. 1, 1996

Related U.S. Application Data

[63] Continuation of Ser. No. 144,812, Oct. 28, 1993, abandoned.

[30] Foreign Application Priority Data

Oct. 29, 1992 [JP] Japan .................................... 4-312641

[51] Int. Cl.[6] ........................................................ C08F 2/46

[52] U.S. Cl. .................................. 522/4; 522/79; 522/83; 522/160; 522/126; 427/508

[58] Field of Search ................................... 522/4, 83, 79, 522/160, 126; 427/508

[56] References Cited

U.S. PATENT DOCUMENTS 3,991,033 11/1976 Sam .................................... 260/67 FP
5,391,685 2/1995 Hitomi et al. ............................ 528/75

FOREIGN PATENT DOCUMENTS 306141 7/1992 European Pat. Off. .

*Primary Examiner*—E. Rollins Buffalow
*Attorney, Agent, or Firm*—Wood, Phillips, VanSanten, Clark & Mortimer

[57] ABSTRACT

Polyoxymethylene articles having a surface printable with an ultraviolet-curing ink are obtained by molding a polyoxymethylene and treating the molded article by ultraviolet irradiation, corona discharge, or electron-beam radiation until the surface has an X-ray photoelectron spectrum in which the ratio of the $[C—O]_n$ bond peak at 302 eV to the C—C bond peak at 305 eV, i.e., the $[C—O]_n$ bond peak/C—C bond peak ratio, is at least 2.5.

6 Claims, 3 Drawing Sheets

Ex.5

EX.4

COMP. EX.4

COMP. EX.1

EXS. 3 AND 8

COMP. EX.3

COMP. EX.2

COMP. EX.1

POLYOXYMETHYLENE ARTICLES HAVING PRINTABLE SURFACE METHOD OF IMPARTING PRINTABILITY TO POLYOXYMETHYLENE

This is a continuation of application Ser. No. 08/144,812 filed on Oct. 28, 1993, which has been abandoned.

BACKGROUND OF THE INVENTION

This invention relates to an improvement in the printability of articles of polyoxymethylenes (acetal resins), a slightly adherent plastic. The technique of the present invention is applicable to the printing, for example, of necessary information on the shutter for opening and closing the head window of a floppy disk, during the manufacture of the shutter from a polyoxymethylene.

Manufactured goods of polyethylene (PE), polypropylene (PP), polyethylene terephthalate (PET), polybutylene terephthalate (PBT), polyoxymethylene (POM=acetal resin), polycarbonate (PC), acrylonitrile-butadiene-styrene (ABS) and other plastics are in extensive use. The plastic articles are printed variously, by screen, tampon, pad, or other printing techniques, depending on the intended uses.

In printing plastic articles, a thermosetting or thermoplastic ink during the process of curing or drying can adversely affect the articles with the heat, the action of the solvent contained, etc. With a thermosetting ink, which needs much time for curing after printing, the whole manufacturing process is largely restricted by the thermosetting time. To overcome these problems, printing with an ultraviolet-curing ink, which cures completely as soon as it is applied for printing, is being widely used.

Of the plastics referred to above, polyoxymethylenes are relatively low priced and have good enough physical properties and moldability to give moldings of high precision. These advantages have made them useful in many applications (e.g., the shutter for opening or closing the head window of a floppy disk). On the other hand, low surface activity makes them only slightly adherent to ink, and their printing with an ultraviolet-curing ink has been believed impossible because of their inability of producing a practicable bond strength with that ink. Today, when there is a need of printing, a thermosetting ink of two-liquid type (consisting of a principal component and a curing agent) is employed. That type of ink is not suited for quantity production and can barely print the substrate. Where printing with an ultraviolet-curing ink is essential, the polyoxymethylene has to be replaced by some other material.

Polyoxymethylene articles of the character have heretofore been molded by the standard runner method. Molten polyoxymethylene resin fed at elevated temperature is introduced into a molding tool held in an ordinary environment, with a consequent temperature drop of the resin. It has now been found that this molding method is one of the factors responsible for the low bond strength of the molded product.

It is therefore an object of the present invention to achieve a substantial improvement of the printability, or bond strength, of an ultraviolet-curing ink with respect to articles of a polyoxymethylene substrate, a slightly adherent plastic substrate.

The present inventors in their preceding patent application Ser. Nos. 189596/1991 and 319647/1991 proposed the addition of a polyisocyanate to a printing ink of the ultraviolet-curing type so as to improve the printability of polyoxymethylenes. It did improve the printability but the improvement is not satisfactory yet.

Further research on the subject has now revealed that the key to a successful improvement in the printability of polyoxymethylenes is allowing the substrate surface to contain at least a certain amount of $[C—O]_n$ bonds. The research showed that the bond strength is not fully improved by mere surface treatment of a polyoxymethylene by corona discharge, ultraviolet-light or electron-beam radiation unless the bonds are sufficiently formed. It is now clear that for the improvement of the printability it is necessary to adjust the temperature for polyoxymethylene molding and use a sufficiently high level of energy for treatment, as of active rays in corona discharge or the like to secure a predetermined amount of $[C—O]_n$ bonds.

SUMMARY OF THE INVENTION

The polyoxymethylene articles according to the present invention are characterized in that the ratio of the $[C—O]_n$ bond peak at 302 eV in an X-ray photoelectron spectrum of the surface to the C-C bond peak at 305 eV, i.e., the $[C—O]_n$ bond peak/C—C bond peak (hereinafter called "bond peak ratio"), is at least 2.5.

It has just been found that the polyoxymethylene articles having such a printable surface can be obtained by increasing the bond peak ratio of the polyoxymethylene by any of the following procedures:

(1) A polyoxymethylene article fabricated by the standard (runner) method that involves injection molding of molten polyoxymethylene into a mold in an ordinary environment is subjected to the action of active rays such as of ultraviolet radiation or corona discharge in the presence of oxygen until the bond peak ratio becomes at least 2.5.

(2) A molten resin being fed is kept at 220° C. or above and is injection-molded into a mold kept at 220° C. or above so that the bond peak ratio is at least 2.5.

(3) A molten resin being fed is kept at 220° C. or above and is introduced into a mold kept at 220° C. or above. When the resulting polyoxymethylene article does not have a bond peak ratio of at least 2.5 or when it has a ratio of 2.5 or more but a further improvement is desired, it is subjected to the action of active rays such as of ultraviolet radiation or corona discharge in the presence of oxygen until the bond peak ratio becomes at least 2.5.

The procedures that prove particularly efficient and give good printability are (2) and (3) above.

DETAILED DESCRIPTION OF THE INVENTION

Figure 1A:
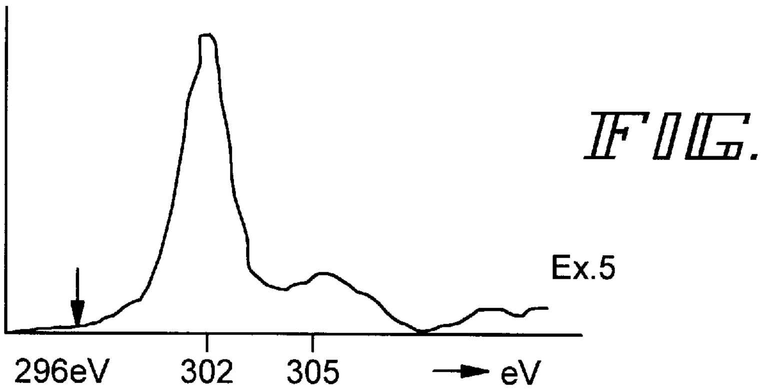
FIG. 1A–1D shows X-ray photoelectron spectra obtained by the standard method with varied periods of ultraviolet-light irradiation.
Figure 1B:
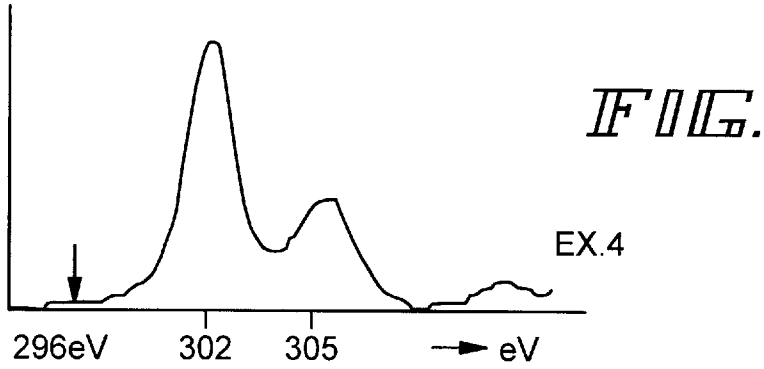
Figure 1C:
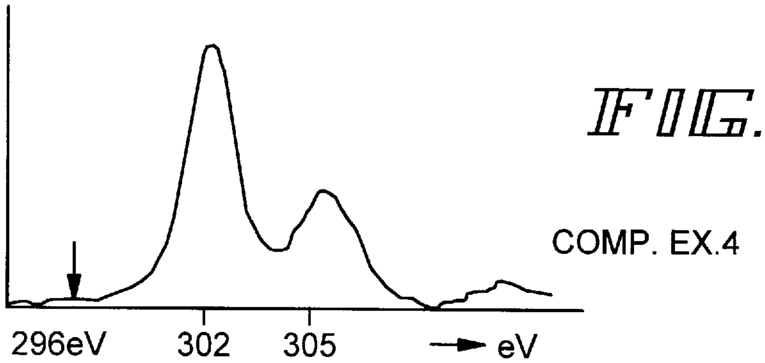
Figure 1D:
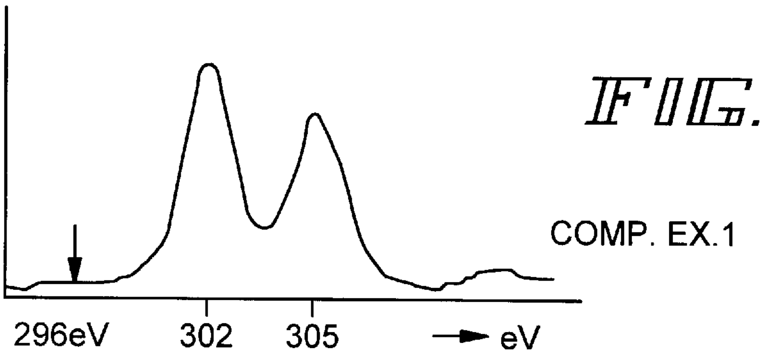
Figure 2A:
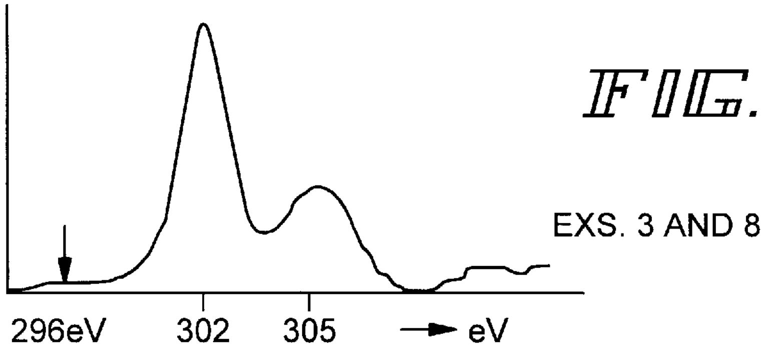
FIG. 2A–2D shows X-ray photoelectron spectra obtained by the standard method with varied frequencies of corona discharge treatment.
Figure 2B:
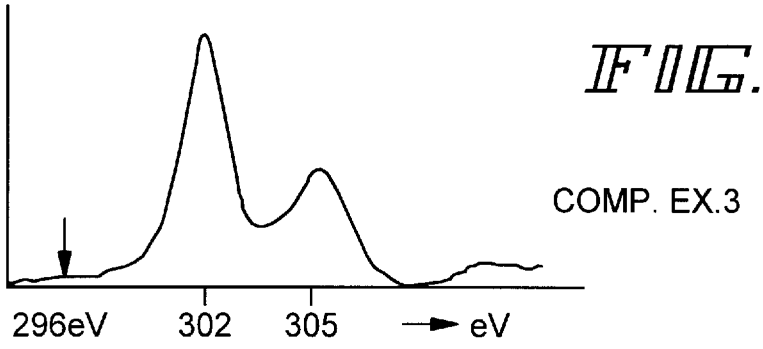
Figure 2C:
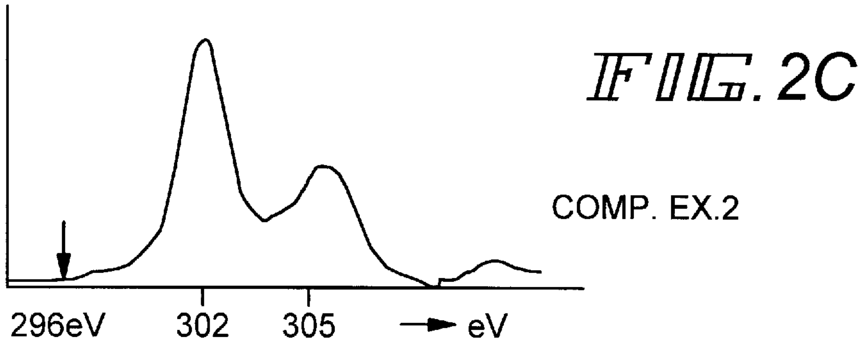
Figure 2D:
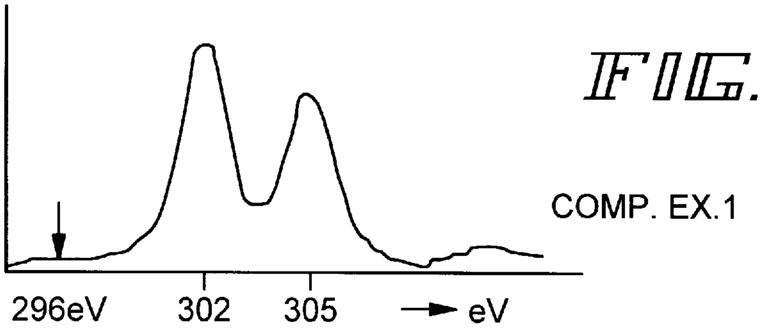

It has been found that when the resin in the mold is at a low temperature as in (1) above, a polyoxymethylene article not irradiated with active rays such as ultraviolet light does not have adequate printability. It thus requires irradiation with active rays, adding to the overall dose of high-energy irradiation. When the mold temperature is high as in (2) and (3) above, the frequency or duration of the treatment with active rays can be reduced, sometimes even to naught. For high printability the resin temperature is elevated while, at the same time, active-ray treatment is performed.

The printing method of the invention is characterized by the steps of printing a polyoxymethylene article having a surface imparted with the printability as defined above with an ultraviolet-curing ink and then irradiating the surface with ultraviolet rays. The ultraviolet-curing ink is preferably compounded with an isocyanate compound for enhanced print bond strength.

Corona discharge and irradiation with ultraviolet rays or electron beam are well-known means for increasing adherence. These treatments are limited, however, to thermoplastic resins, such as polyethylene terephthalates, polyethylenes, and polypropylenes, and some thermosetting resins. Polyoxymethylenes belong to neither group and are unusually inert, and it has not been believed possible that the treatment by corona discharge should improve the printability of polyoxymethylenes. The present invention requires higher energy than that of conventionally employed active rays.

The ultraviolet radiation with a wave length of 356 nm commonly used for the ultraviolet curing of printing ink is not satisfactory for the purposes of the invention; radiation with a shorter wave length, say of 254 nm, is needed. In the case of electron-beam radiation, a total dose of at least about 2 Mrad has been found necessary.

The ultraviolet-curing ink for use in the printing method of the invention, with or without the addition of an isocyanate compound, may generally be a composition containing a photopolymerizable oligomer (prepolymer), photopolymerizable monomer (reactive diluent), photoinitiator, photoinitiation assistant, colorant (pigment), and other additives. The photopolymerizable oligomer is an oligomer possessing one or several vinyl functional groups such as acryloyl groups and is polymerized upon irradiation or heating to a polymer. Under the invention at least one oligomer chosen from among epoxyacrylate, epoxidized oil acrylate, urethane acrylate, unsaturated polyesters, polyester acrylate, polyether acrylate, vinyl/acrylate, polyene/thiol, silicon acrylate, polybutadiene, and polystyrylethyl methacrylate. Photopolymerizable monomers often are low in molecular weight and viscosity and high in reactivity and solubility. In the present invention either at least one monofunctional acrylate (methacrylate) having one acryloyl or methacryloyl group per molecule or at least one polyfunctional acrylate having two or more such groups per molecule may be used. The photoinitiator may be any of those which are classified into two types: the intramolecular bond cleavage type which undergoes molecular cleavage by itself upon irradiation to form radicals and the intermolecular hydrogen abstract type which forms a complex with a hydrogen donor on irradiation, whereby hydrogen atoms are caused to migrate intermolecularly into the initiator molecules for radical generation. The photoinitiation assistant is not activated itself by ultraviolet-light irradiation but, when used together with a photoinitiator, it accelerates the initiation reaction and permits the progress of a curing reaction more efficiently than when the photoinitiator alone is used. As regards ultraviolet-curing compositions, refer to the literature, e.g., Kiyomi Katoh, "Ultraviolet Curing Systems," General Technical Center, Inc.

The isocyanate compounds that may be employed in the present invention are one or more polyisocyanate compounds containing two or more isocyanate groups, such as MDI, TDI, HDI, IPDI, and XDI.

The amount of such an isocyanate compound or compounds to be added in accordance with the invention ranges from 0.5 to 35 parts by weight, preferably from 3 to 25 parts by weight, per 100 parts by weight of an ultraviolet-curing ink. Excessive addition results in reduced printability and curing rate. An isocyanate content within the range specified above ensures higher bond strength, printability, and curing rate than otherwise.

A slightly adherent plastic, the polyoxymethylene that is employed under the invention proves adequately effective when used alone. If greater bond strength is to be attained, it may contain a necessary additive or additives.

The invention will be described in detail below in connection with concrete examples thereof. The peeling tests the results of which are given in Table 1 were conducted by affixing a length of tape to a test printed surface, rubbing the tape repeatedly for tight adhesion to the test piece, peeling the tape all at once, and inspecting the peeled condition. For the crosscut peel test, a test printed surface was lightly cut crosswise with a cutter into a checkered pattern of meshes one millimeter square each. A length of cellophane tape was affixed to the printed test piece, rubbed hard against the test piece for intimate contact, and then peeled off in a stroke. The exposed surface was inspected to see if the print was stripped and was rated with a mark ○ (not peeled), Δ (very slightly peeled), or x (noticeably peeled). The ratings ○ and Δ were deemed acceptable.

Examples 1 to 7 and Comparative Examples 1 to 5 used an ultraviolet-curing ink not containing any isocyanate compound, while other examples used an isocyanate-containing ink. For the purposes of the invention, the procedure in which the injection mold temperature was set to 220° C. is called the hot method and that in which the mold was not heated is called the standard method.

Examples 1 to 3 and Comparative Examples 1 to 3 involved treatment by corona discharge.

EXAMPLE 1

(hot method, corona-treated)

Polyoxymethylene was molded into a sheet by an injection molding machine heated to 220° C. along with the mold, at an injection pressure of 1500 kg/cm$^2$.

The polyoxymethylene sheet was once treated by corona discharge (at 600 W and at a test piece speed of 25 m/min during the treatment).

The sample thus obtained was subjected to an X-ray photoelectron spectral analysis using an X-ray photoelectron measuring instrument with a rating of 8 kV-30 mm (manufactured by Shimadzu Corp. and marketed under the trade designation "ESCA750") in an atmosphere at 5×10$^{-8}$ Torr.

In the X-ray photoelectron spectrum, the ratio of the $[C—]_n$ bond peak at 302 eV to the C—C bond peak at 305 eV, i.e., the $[C—C]_n$ bond peak/C—C bond peak (hereinafter called "bond peak ratio") was 3.4. As will be described later, the higher this ratio the better the adherence will become.

A sample of the surface-treated polyoxymethylene so obtained was printed with the following printing ink.

An ultraviolet-curing ink A (epoxyacrylate oligomer/polyfunctional acrylate/photoinitiator/color paste/pigment=

45/30/3/12/10) was used in screen printing the polyoxymethylene test piece through a 270-mesh screen. The printed surface was cured to give a sample on irradiation for 2 seconds by an ultraviolet irradiation apparatus with ultraviolet radiation intensity of 400 mW/cm$^2$ at a wave length of 365 nm. Both peeling and crosscut peel tests, as shown in Table 1, gave good results.

EXAMPLE 2

(hot method, untreated)

A polyoxymethylene sample was obtained in the same way as described in Example 1 with the exception that the corona discharge treatment was omitted from the process. The bond peak ratio was 3.0.

The sample was printed as in Example 1. The results of peeling and crosscut peel test are given in Table 1. The peeling test gave a satisfactory result but the crosscut peel test caused a very slight peel.

EXAMPLE 3

(standard method, corona-treated)

Polyoxymethylene was molded into a sheet by an injection molding machine which alone had been heated to 220° C. while the passage on the way and the mold had been left at ordinary temperature, at an injection pressure of 1500 kg/cm$^2$. The resulting sample was treated three times by the corona discharge referred to in Example 1. The bond peak ratio was 2.5.

The sheet was printed following the procedure of Example 1 to obtain a sample. The sample gave good result in a peeling test but showed a very slight peel on a crosscut peel test.

COMPARATIVE EXAMPLE 1

(standard method, untreated)

Injection molding was performed in accordance with Example 3 excepting that the corona discharge was not resorted to. The sample thus obtained had a bond peak ratio of 1.3.

The sample was printed by the procedure of Example 1. Both peeling test and crosscut peel test gave poor results.

COMPARATIVE EXAMPLE 2

(standard method, corona-treated)

The corona treatment of Example 1 was done once but otherwise the procedure of Example 3 was repeated for injection molding. The bond peak ratio of the resulting sample was 2.0.

The sample was printed in the manner described in Example 1. The peeling test gave good result but the crosscut peel test did not.

COMPARATIVE EXAMPLE 3

(standard method, corona-treated)

The corona treatment of Example 1 was done twice but otherwise the procedure of Example 3 was following for injection molding. The bond peak ratio of the sample was 2.1.

The sample was printed in conformity with Example 1. It proved satisfactory in a peeling test but not in a crosscut peel test.

Examples 4 to 6 and Comparative Example 4 involve ultraviolet treatment.

EXAMPLE 4

(standard method, ultraviolet-treated)

Polyoxymethylene was molded into a sheet by an injection molding machine which alone had been heated to 220° C., at an injection pressure of 1500 kg/cm$^2$. Next, the polyoxymethylene sheet was irradiated with ultraviolet rays with a radiation intensity of 35 mW/cm$^2$ at a wave length of 2540 nm for 60 seconds. The bond peak ratio of the resulting sample was 2.6.

The surface-treated polyoxymethylene sample so obtained was printed in accordance with Example 1. The results of peeling and crosscut peel tests are given in Table 1. The peeling test showed it satisfactory but the crosscut peel test revealed a very slight peel.

EXAMPLE 5

(standard method, ultraviolet-treated)

Ultraviolet irradiation was carried out for 180 seconds but otherwise the procedure of Example 4 was repeated to obtain a sample. Its bond peak ratio was 4.6.

Printing in conformity with Example 1 gave a sample. It proved satisfactory in both peeling and crosscut peel tests.

COMPARATIVE EXAMPLE 4

(standard method, ultraviolet-treated)

Except for ultraviolet irradiation for 30 seconds, the procedure of Example 4 was followed to obtain a sample. Its bond peak ratio was 2.3.

It was printed as in Example 1 to obtain a sample. The sample only slightly peeled on a peeling test but peeled substantially on a crosscut peel test.

EXAMPLE 6

(hot method, ultraviolet-treated)

A polyoxymethylene sample was obtained by following the procedure of Example 4 except that the injection molding machine and mold were both heated to 220° C. The bond peak ratio was 3.8.

Printing in accordance with Example 1 gave a sample. It did not peel on both peeling and crosscut tests.

The following are examples involving electron-beam treatment.

EXAMPLE 7

(standard method, electron-beam-treated)

Polyoxymethylene was molded into a sheet by an injection molding machine which had been heated to 220° C. and with the passage on its way and a mold left at the ordinary temperature, at an injection pressure of 1500 kg/cm$^2$. Next, the polyoxymethylene sheet was irradiated with an electron beam of 5 Mrad at an acceleration voltage of 250 kV. The bond peak ratio of the resulting sample was 4.8.

The polyoxymethylene sample thus surface-treated was printed in the manner described in Example 1. The results of peeling and crosscut peel tests are shown in Table 1. The sample performed satisfactorily in the both tests.

EXAMPLE 8

This is an example in which the printing ink used contained an isocyanate. A sample was molded and corona-treated by following the procedure of Example 3, with the exception that 5 wt % IPDI was added to the printing ink.

Figure 3:
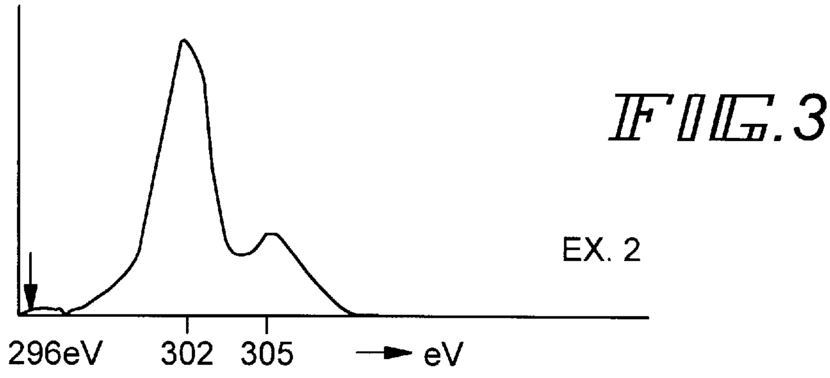
FIG. 3 shows an X-ray photoelectron spectrum obtained by the hot method without any treatment.
Figure 4:
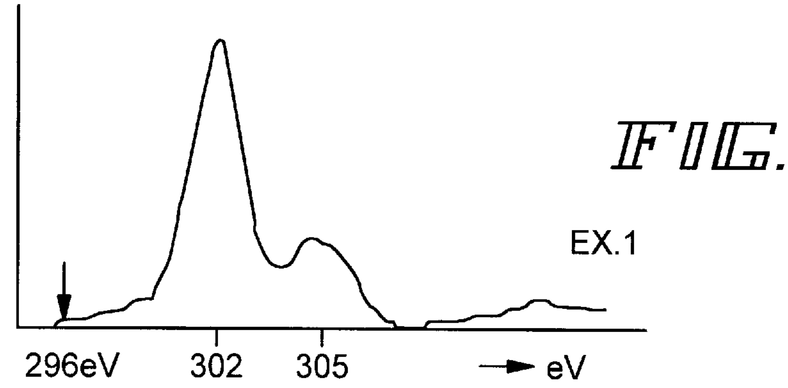
FIG. 4 shows an X-ray photoelectron spectrum obtained by the hot method with corona discharge treatment.
Figure 5:
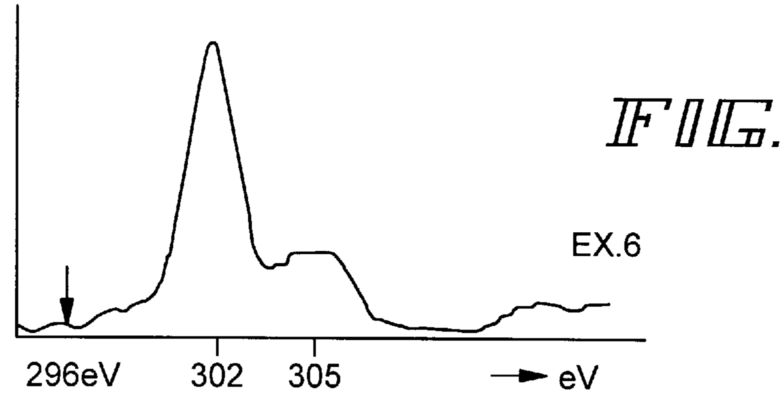
FIG. 5 shows an X-ray photoelectron spectrum obtained by the hot method with ultraviolet radiation treatment.
Figure 6:
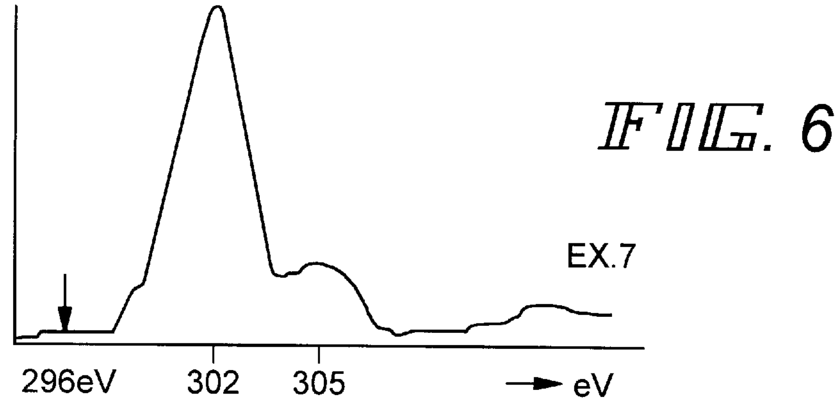
FIG. 6 shows an X-ray photoelectron spectrum obtained by the standard method with electron-beam radiation.

The results are given in Table 1. Also, actually determined values of the regions around the 302–305 eV range of X-ray photoelectron spectra are graphically represented. FIG. 1 shows X-ray photoelectron spectra obtained by the standard method with varied ultraviolet irradiation durations; FIG. 2 shows those by the standard method with varied frequencies of corona discharge treatment; FIG. 3 shows an X-ray photoelectron spectrum by the hot method without any treatment; FIG. 4 shows that by the hot method with corona discharge treatment; FIG. 5 shows that by the hot method with ultraviolet radiation treatment; and FIG. 6 shows that by the standard method with electron-beam radiation. Throughout these spectra the arrows indicate reference lines and the vertical axes represent relative scales.

TABLE 1

| | Molding method | Pretreatment | Peak ratio | Peel-ing | Cross-cut peel |
|---|---|---|---|---|---|
| Example 1 | Hot method | Corona, once | 3.4 | ○ | ○ |
| Example 2 | Hot method | None | 3.1 | ○ | Δ |
| Example 3 | Standard | Corona, thrice | 2.5 | ○ | Δ |
| Example 4 | Standard | UV, 60 sec. | 2.6 | ○ | Δ |
| Example 5 | Standard | UV, 120 sec. | 5.6 | ○ | ○ |
| Example 6 | Hot | UV, 30 sec. | 3.8 | ○ | ○ |
| Example 7 | Standard | Elec-beam, 5 Mrad | 4.8 | ○ | ○ |
| Comp. Ex. 1 | Standard | None | 1.3 | X | X |
| Comp. Ex. 2 | Standard | Corona, once | 2.0 | ○ | X |
| Comp. Ex. 3 | Standard | Corona, twice | 2.1 | ○ | X |
| Comp. Ex. 4 | Standard | UV, 30 sec. | 2.3 | Δ | X |
| Example 8 | Standard | Corona, thrice | 2.5 | ○ | ○ |

As described above, polyoxymethylene is molded by the hot method while the mold temperature is kept at 200° C. or above until a $[C—O]_n$ bond peak/C—C bond peak ratio of at least 2.5 is attained. Alternatively, polyoxymethylene is molded by the hot method or the standard method and is treated by corona discharge or the like until the desired $[C—O]_n$ bond peak/C—C bond peak ratio of at least 2.5 is reached. In this way an article of polyoxymethylene, polypropylene, or other slightly adherent plastics can be satisfactorily printed with an ultraviolet-curing ink. Mass producibility is enhanced, difficulties with the use of conventional thermosetting ink are overcome, and the outstanding features of polyoxymethylene products can be fully exploited.

What is claimed is:

1. A polyoxymethylene article having a surface printed with an ultraviolet curing isocyanate free ink, said surface having an X-ray photoelectron spectrum in which the ratio of the $(C—O)_n$ bond peak at 302 eV to the C—C bond peak at 305 eV, i.e., the $(C—O)_n$ bond peak/C—C bond peak ratio, is at least 2.5.

2. A method of imparting printability to a polyoxymethylene article which comprises subjecting a polyoxymethylene article having a surface to be printed on with an isocyanate free ink to the action of active rays chosen form among ultraviolet rays, corona discharge, and electron beam, in the presence of oxygen, until the surface attains an X-ray photoelectron spectrum in which the ratio of the $(C—O)_n$ bond peak at 302 eV to the C—C bond peak at 305 eV, i.e., the $(C—O)_n$ bond peak/C—C bond peak ratio, is at least 2.5.

3. A method of imparting printability to a polyoxymethylene article which comprises feeding molten polyoxymethylene at 200° C. or above to an injection mold kept at 200° C. or above, conducting injection molding, and holding the resulting polyoxymethylene article until the surface of the article capable of being printed on with an isocyanate free ink attains an X-ray photoelectron spectrum in which the ratio of the $(C—O)_n$ bond peak at 302 eV to the C—C bond peak at 305 eV, i.e., the $(C—O)_n$ bond peak/C—C bond peak ratio, is at least 2.5.

4. The method according to claim 4 which further comprises subjecting a polyoxymethylene article to the action of active rays selected from the group consisting of ultraviolet rays, corona discharge and electron beam, in the presence of oxygen, until the ratio of at least 2.5 is attained.

5. A method of printing a polyoxymethylene article which comprises printing the surface of a polyoxymethylene article having an X-ray photoelectron spectrum in which the ratio of the $(C—O)_n$ bond peak at 302 eV to the C—C bond peak at 305 eV, i.e., the $(C—O)_n$ bond peak/C—C bond peak ratio, is at least 2.5 with an ultraviolet curing isocyanate free ink, and then irradiating the printed surface with ultraviolet rays.

6. A polyoxymethylene article having a surface printed with an ultraviolet curing isocyanate free ink which is to be permanently bonded to the printable surface, said surface having an X-ray photoelectron spectrum in which the ratio of the $(C—O)_n$ bond peak at 302 eV to the C—C bond peak at 305 eV, i.e., the $(C—O)_n$ bond peak/C—C bond peak ratio, is at least 2.5.

* * * * *